(12) United States Patent
Heider et al.

(10) Patent No.: US 6,866,710 B2
(45) Date of Patent: Mar. 15, 2005

(54) INORGANIC SPHERICAL ABSORPTION PIGMENTS

(75) Inventors: Lilia Heider, Winchester (GB); Martin Knapp, Dieburg (DE); Gisela Lenz, Gross-Gerau (DE); Norbert Rick, Darmstadt (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 10/736,893

(22) Filed: Dec. 17, 2003

(65) Prior Publication Data

US 2004/0177789 A1 Sep. 16, 2004

(30) Foreign Application Priority Data

Dec. 17, 2002 (DE) ........................................ 102 59 246

(51) Int. Cl.[7] .................................................. C09C 1/62
(52) U.S. Cl. ...................... 106/403; 106/419; 106/450; 106/453; 106/456; 106/480; 106/482; 106/442; 106/401; 106/479; 424/69; 424/401; 427/212; 428/403; 428/404; 428/405

(58) Field of Search ................................. 106/403, 419, 106/450, 453, 456, 479, 480, 482, 442, 401; 427/212; 424/69, 401; 428/403, 404, 405

(56) References Cited

FOREIGN PATENT DOCUMENTS

JP       2001-049142    *  2/2001    ............. C09C/1/28

* cited by examiner

*Primary Examiner*—C. Melissa Koslow
*Assistant Examiner*—Shalie A. Manlove
(74) *Attorney, Agent, or Firm*—Millen, White, Zelano, Branigan, P.C.

(57) ABSTRACT

The present invention relates to inorganic spherical absorption pigments which have a bimodal particle-size distribution, at least one color-providing layer and a final $SiO_2$ layer, and to the use thereof in paints, coatings, printing inks, security printing inks, plastics, ceramic materials, glasses, as tracers, in cosmetic formulations and for the preparation of pigment preparations and dry preparations.

18 Claims, No Drawings

INORGANIC SPHERICAL ABSORPTION PIGMENTS

The present invention relates to inorganic spherical absorption pigments which have a bimodal particle-size distribution, at least one color-providing layer and a final $SiO_2$ layer, and to the use thereof in paints, coatings, printing inks, security printing inks, plastics, ceramic materials, glasses, as tracers, in cosmetic formulations and for the preparation of pigment preparations and dry preparations.

Before use in the system to be pigmented, inorganic absorption pigments have to be converted into a form which enables easy dispersal and a reproducing color. These pretreatments of the pigments, for example grinding, which crucially influence the quality of the end product are time-consuming and expensive. It is furthermore disadvantageous that the color of the pigment is modified on wetting. For cosmetic formulations, the pigments additionally have to have a good feel on the skin, which the classical absorption pigments only exhibit to a small extent.

Inorganic absorption pigments based on spherical particles, in particular $SiO_2$ beads, are increasingly being employed in cosmetics since they firstly give the human skin a natural appearance and secondly make wrinkles substantially invisible.

Inorganic spherical absorption pigments which are coated with a color-providing layer are disclosed, for example, in the laid-open specifications JP 62-288662, JP 06-11872, JP 11-139926, JP 11-335240 and DE 199 29 109:

WO 00/15720 discloses a pigment mixture based on spherical $SiO_2$ particles having high light diffusion, where some of the $SiO_2$ beads are coated with $TiO_2/SiO_2$ and the remainder with $TiO_2$ and $Fe_2O_3$.

WO 99/66883 describes $SiO_2$ beads coated with metal oxides, such as titanium oxide, iron oxide or zinc oxide, which have a final $SiO_2$ layer. The $SiO_2$ beads coated in this way are employed in cosmetic formulations in the form of a mixture with interference pigments.

These spherical absorption pigments based on $SiO_2$ beads exhibit relatively good skin feeling, but have the disadvantage that their hiding power is too low.

An object of the present invention is therefore to provide spherical absorption pigments which, besides good skin feeling, simultaneously have very good optical properties and high hiding power and can be prepared in a simple manner.

Upon further study of the specification and appended claims, further objects and advantages of this invention will become apparent to those skilled in the art.

Surprisingly, it has been found that spherical absorption pigments which have at least one color-providing layer, a bimodal particle-size distribution and a final $SiO_2$ layer have significantly higher hiding power than the absorption pigments from the prior art. The final $SiO_2$ layer significantly increases the optical properties of the pigments in color, color purity and tinting strength.

The invention therefore relates to spherical absorption pigments which:
   comprise a component A based on spherical particles having a particle size of 1–100 nm which are coated with one or more color-providing layers and have a top layer of $SiO_2$
and
   comprise a component B based on spherical particles having a particle size of 0.5–50 µm which are coated with one or more color-providing layers and have a top layer of $SiO_2$.

Compared with the known absorption pigments, the spherical absorption pigments according to the invention exhibit
   higher color purity
   particularly high hiding power
   higher tinting strength
   improved skin feeling
   improved processing properties
   easier dispersibility.

The invention furthermore relates to the use of the spherical absorption pigments according to the invention in paints, coatings, preferably in industrial coatings, printing inks, security printing inks, plastics, ceramic materials, glasses, as tracers and in particular in cosmetic formulations. The absorption pigments according to the invention are furthermore also suitable for the preparation of pigment preparations and for the preparation of dry preparations, such as, for example, in the form of granules, chips, pellets, sausages, briquettes, etc. The dry preparations are used, in particular, in printing inks and in cosmetics.

Suitable base substrates as the spherical particles are all spherical particles known to the person skilled in the art, such as, for example, $SiO_2$ beads, $TiO_2$ beads, glass beads, hollow glass beads, polymer beads, for example nylon beads, and nanoscale spherical metal particles, for example of iron, gold or silver. These spherical pigments are commercially available, for example from 3M, Bayer AG, Merck KGaA, or can be prepared to suit the aim or use based on nanotechnological processes and sol-gel processes. The base substrates of component A and component B are particularly preferably $SiO_2$ beads. However, the base substrates of component A and component B may also be different.

The nanoscale spherical base substrates of component A have particle sizes in the range 1–100 nm, preferably 5–80 nm and in particular 10–70 nm. Preferred nanoscale base substrates are $SiO_2$ beads, furthermore $TiO_2$ beads and glass beads.

Suitable base substrates for component B have particle sizes of 0.5–50 µm, in particular 0.8–40 µm and particularly preferably 1–30 µm. Preferred base substrates are, in particular, $SiO_2$ beads, furthermore $TiO_2$ beads and glass beads.

The preparation of spherical pigments is known. Thus, for example, bead-form silicon dioxide is generally prepared by hydrolysis of organic or inorganic silicon compounds in an emulsion process. Processes of this type are described, for example, in DE 21 55 281, DE 26 10 852, GB 1,141,924 and EP 0 162 716. Bead-form $SiO_2$ is commercially available, for example under the trade name Levasil® from Bayer or Ronasphere® from Merck KGaA. Levasil® 200 has particle sizes of 10–80 nm, while Ronasphere® has a particle size of less than 20 µm.

Components A and B can be mixed with one another in any ratio. The ratio of the coated substrates of component A to the coated substrates of component B is preferably from 10:1 to 1:10, in particular from 8:2 to 5:5. The substrates of component A and component B can be mixed with one another in water and/or an organic solvent or solvent mixture. It is also possible, if the base substrates of component A and component B have an identical colored coating, to mix the base substrates of component A and component B in advance and subsequently to coat them jointly.

The spherical base substrates are coated with one or more color-providing layers, preferably with one, two, three, four, five, six or seven layers, in particular with one or two or three color-providing layers. The coating of the base substrates of component A and component B can be carried out in a one-pot process or in each case separately. The number of layers on the nanoscale beads of component A may be identical to or different from the number of color-providing layers of component B. The same applies to the layer sequences, which may be identical or different. Both the number of layers, the composition of the layers and the layer sequences of components A and B are preferably identical.

The proportion by weight of all color-providing layers in component A is preferably from 65 to 95%, in particular from 70 to 80%. The proportion by weight of all color-providing layers in component B is preferably from 15 to 65%, in particular from 20 to 55%.

The color-providing layer is preferably one or more metal-oxide layers, metal-sulfide layers, metal-nitride layers, metal-oxynitride layers, metal layers or mixtures thereof.

The color-providing layer preferably consists of $TiO_2$, $ZrO_2$, $SnO_2$, $ZnO$, $BiOCl$, $Ce_2O_3$, $FeO(OH)$, $Fe_2O_3$, $Fe_3O_4$, $TiFe_2O_5$, $Cr_2O_3$, $Fe_4[Fe(CN)_6]_3$, titanium suboxides ($TiO_2$ partially reduced with oxidation states of from <4 to 2, such as the lower oxides $Ti_3O_5$, $Ti_2O_3$ to $TiO$), titanium oxynitrides and titanium nitride, $CoO$, $CO_3O_4$, $VO_2$, $V_2O_3$, $NiO$, $CoAl_2O_4$, $BiVO_4$, $Ce_2S_3$, $MoS_2$, Al, Fe, Cr, Ag, Au, Pt, Pd or mixtures or combinations thereof. The $TiO_2$ layer can be in the rutile or anatase modification, preference being given to anatase.

The color-providing layers are preferably one or more metal-oxide layers, in particular $TiO_2$, $Fe_2O_3$, $Fe_3O_4$, $FeO(OH)$, such as, for example, $TiFeO_3$, $TiFe_2O_5$, pseudobrookite or mixtures thereof. Particular preference is given to $SiO_2$ beads which are coated with $TiO_2$, $Fe_2O_3$, $Fe_3O_4$, $FeO(OH)$ and/or $TiFe_2O_5$.

Components A and B particularly preferably have the following layer sequences:

spherical base substrate+$TiO_2$+$SiO_2$ spherical base substrate+$Fe_2O_3$+$SiO_2$ spherical base substrate+$FeO(OH)$+$SiO_2$ spherical base substrate+$Fe_3O_4$+$SiO_2$ spherical base substrate+$TiFe_2O_5$+$SiO_2$ spherical base substrate+$Cr_2O_3$+$SiO_2$ spherical base substrate+$Ce_2S_3$+$SiO_2$ spherical base substrate+$TiO_2$+$Fe_2O_3$+$SiO_2$ spherical base substrate+$TiO_2$+$Fe_3O_4$+$SiO_2$ spherical base substrate+$TiO_2$+$SiO_2$+$TiO_2$+$SiO_2$ spherical base substrate+$TiO_2$+$SiO_2$+$Fe_2O_3$+$SiO_2$ spherical base substrate+$TiO_2$+$Fe_4[Fe(CN)_6]_3$+$SiO_2$ Particular preference is given to absorption pigments which are based exclusively on $SiO_2$ beads and where component A and component B have one or more metal-oxide layers, preferably from the group consisting of $TiO_2$, $Fe_2O_3$ and $Fe_3O_4$. Especial preference is given to absorption pigments where the color-providing metal-oxide layer(s) of component A and component B is (are) identical.

The absorption pigments according to the invention can be prepared relatively simply in various ways. If the base substrates of components A and B are to have an identical coating, the base substrates can firstly be mixed and subsequently coated with a color-providing coating by wet-chemical coating or by the CVD or PVD process. It is furthermore also possible to coat each of the base substrates of components A and B separately and to mix them in the desired ratio when the coating is complete. In order to avoid agglomerate formation, it is frequently advisable to coat the base substrates of components A and B separately with the color-providing layer and a final $SiO_2$ layer. However, the mixture of components A and B is generally not prepared with the dried and optionally calcined coated spherical particles, but in the form that the spherical pigments remain in the suspension after coating with $SiO_2$ and the pigment suspensions are mixed with one another. In general, the suspension of component A is added to the suspension of component B, and the mixture is stirred. The absorption pigment according to the invention having the bimodal particle-size distribution is finally filtered off, washed with water, dried and optionally calcined.

The metal-oxide layers are preferably applied by wet-chemical processes, it being possible to use the wet-chemical coating processes developed for the preparation of pearlescent pigments. Processes of this type are described, for example, in U.S. Pat. No. 3,087,828, U.S. Pat. No. 3,087,829, U.S. Pat. No. 3,553,001, DE 14 67 468, DE 19 59 988, DE 20 09 566, DE 22 14 545, DE 22 15 191, DE 22 44 298, DE 23 13 331, DE 25 22 572, DE 31 37 808, DE 31 37 809, DE 31 51 343, DE 31 51 354, DE 31 51 355, DE 32 11 602, DE 32 35 017, DE 196 18 568, EP 0 659 843, or in further patent documents and other publications known to the person skilled in the art.

In the case of wet-chemical coating, the spherical base substrates are suspended in water, and one or more hydrolysable metal salts are added at a pH which is suitable for hydrolysis, which is selected in such a way that the metal oxides or metal oxide hydrates are precipitated directly onto the beads without secondary precipitations occurring. The pH is usually kept constant by simultaneous metered addition of a base or acid. The pigments are subsequently separated off, washed and dried, preferably at 80–150° C., in particular at 90–120° C., and optionally calcined, it being possible for the calcination temperature to be optimized with respect to the coating present in each case. In general, the calcination temperatures are between 250 and 1000° C., preferably between 350 and 900° C. If desired, the absorption pigments can be separated off after application of individual coatings, washed and optionally calcined and then re-suspended again for precipitation of the further layers.

The coating can furthermore also be carried out in a fluidized-bed reactor by gas-phase coating, it being possible to use correspondingly, for example, the processes proposed in EP 0 045 851 and EP 0 106 235 for the preparation of pearlescent pigments. In the case where the color-providing layers comprise $Fe_3O_4$ or other reduced oxide nitride species, a reduction step, for example calcination in a reducing atmosphere, may be necessary as the final process step.

Titanium suboxide layers can be produced, for example, by reduction of the $TiO_2$ layer using ammonia, hydrogen or alternatively hydrocarbons and hydrocarbon/ammonia mixtures, as described, for example, in EP-A-0 332 071, DE 19 51 696 and DE 19 51 697. The reduction is preferably carried out at from 800 to 1000° C. under forming gas (8% of H2/92% of N2).

For application of the final $SiO_2$ layer, use is preferably made of the process described in DE 196 18 569. For the production of the $SiO_2$ layer, use is preferably made of sodium water-glass solution or potassium water-glass solution.

The hue of the spherical absorption pigments can be varied in broad limits through different choice of the coating amounts or the layer thicknesses resulting therefrom. The fine tuning for a certain hue can be achieved beyond the pure choice of amount by approaching the desired color under visual or measurement technology control.

In order to increase the light, water and weather stability, it is frequently advisable to subject the finished absorption pigment to post-coating or post-treatment, depending on the area of application. Suitable post-coatings or post-treatments are, for example, the processes described in German Patent 22 15 191, DE-A 31 51 354, DE-A 32 35 017 or DE-A 33 34 598. This post-coating onto the final $SiO_2$ layer further increases the chemical stability or simplifies handling of the absorption pigment, in particular incorporation into various media. In order to improve the wettability, dispersibility and/or compatibility with the user media, functional coatings of $Al_2O_3$ or $ZrO_2$ or mixtures thereof can be applied to the pigment surface. Also possible are organic post-coatings, for example with silanes, as described, for example, in EP 0090259, EP 0 634 459, WO 99/57204, WO 96/32446, WO 99/57204, U.S. Pat. No. 5,759,255, U.S. Pat. No. 5,571,851, WO 01/92425 or in J. J. Ponjeé, Philips Technical Review, Vol. 44, No. 3, 81 ff. and P. H. Harding J. C. Berg, *J. Adhesion Sci. Technol.* Vol. 11 No. 4, pp. 471–493.

The absorption pigments according to the invention are compatible with a multiplicity of color systems, preferably from the areas of paints, coatings and printing inks. For the preparation of printing inks for, for example, gravure printing, flexographic printing, offset printing and offset overprint varnishing, a multiplicity of binders, in particular water-soluble grades, is suitable, as marketed, for example, by BASF, Marabu, Pröll, Sericol, Hartmann, Gebr. Schmidt, Sicpa, Aarberg, Siegberg, GSB-Wahl, Follmann, Ruco or Coates Screen INKS GmbH. The printing inks can be water-based or solvent-based. The pigments are furthermore also suitable for the laser marking of paper and plastics and for applications in the agricultural sector, for example for greenhouse sheeting, and, for example, for the coloring of tent awnings.

Since the spherical absorption pigments according to the invention combine a very pure body color with unusually high hiding power, they can be used to achieve particularly effective effects in the various use media, for example in cosmetic formulations, such as, for example, nail varnishes, lipsticks, compact powders, gels, lotions, soaps, toothpastes, in coatings, in particular industrial coatings and powder coatings, and in plastics and in ceramics.

Owing to the good skin feeling and very good skin adhesion, the absorption pigments according to the invention are particularly suitable for decorative cosmetics, but also for personal care applications, such as, for example, body lotions, emulsions, soaps, shampoos, etc.

It goes without saying that, for the various applications, the absorption pigments according to the invention can also advantageously be used in blends with effect pigments, such as, for example, metal-effect pigments, pearlescent pigments, interference pigments, goniochromatic pigments or organic dyes, organic pigments or other pigments, such as, for example, transparent and opaque white, colored and black pigments, and with flake-form iron oxides, organic pigments, holographic pigments, LCPs (liquid crystal polymers) and conventional transparent, colored and black luster pigments based on metal oxide-coated mica, glass, $Al_2O_3$ and $SiO_2$ flakes, etc. The absorption pigments according to the invention can be mixed in any ratio with commercially available pigments and fillers.

Fillers which may be mentioned are, for example, natural and synthetic mica, nylon powder, pure or filled melamine resins, talc, glasses, kaolin, oxides or hydroxides of aluminum, magnesium, calcium, zinc, BiOCl, barium sulfate, calcium sulfate, calcium carbonate, magnesium carbonate, carbon, and physical or chemical combinations of these substances. There are no restrictions regarding the particle shape of the filler. It can be, for example, flake-form, spherical or needle-shaped in accordance with requirements.

The absorption pigments according to the invention can of course also be combined in the formulations with cosmetic raw materials and assistants of any type. These include, inter alia, oils, fats, waxes, film formers, preservatives and assistants which generally determine the technical properties, such as, for example, thickeners and rheological additives, such as, for example, bentonites, hectorites, silicon dioxides, Ca silicates, gelatines, high-molecular-weight carbohydrates and/or surface-active assistants, etc.

The formulations comprising the absorption pigments according to the invention may belong to the lipophilic, hydrophilic or hydrophobic type. In the case of heterogeneous formulations having discrete aqueous and non-aqueous phases, the pigments according to the invention may in each case be present in only one of the two phases or alternatively distributed over both phases.

The pH values of the formulations can be between 1 and 14, preferably between 2 and 11 and particularly preferably between 5 and 8.

No limits are set for the concentrations of the absorption pigments according to the invention in the formulation. They can be—depending on the application—between 0.001 (rinse-off products, for example shower gels) and 100%. The absorption pigments according to the invention may furthermore also be combined with cosmetic active ingredients. Suitable active ingredients are, for example, insect repellents, UV A/BC protective filters (for example OMC, B3 and MBC), anti-ageing active ingredients, vitamins and derivatives thereof (for example vitamin A, C, E, etc.), self-tanning agents (for example DHA, erythrulose, inter alia), and further cosmetic active ingredients, such as, for example, bisabolol, LPO, ectoin, emblica, allantoin, bioflavonoids and derivatives thereof.

The absorption pigments according to the invention are furthermore suitable for the preparation of flowable pigment preparations and dry preparations, in particular for printing inks and cosmetic formulations, comprising one or more absorption pigments according to the invention, binders and optionally one or more additives.

The invention thus also relates to the use of the absorption pigments according to the invention in paints, coatings, printing inks, security printing inks, plastics, ceramic materials, glasses, as tracers, in cosmetic formulations and for the preparation of pigment preparations and dry preparations.

The entire disclosure of all applications, patents and publications, cited herein and of corresponding German application No. 102 59 246.2, filed Dec. 17, 2002 is incorporated by reference herein.

The following examples are intended to explain the invention in greater detail, but without restricting it.

EXAMPLES

The foregoing examples can be repeated with similar success by substituting the generically or specifically described reactants and/or operating conditions of this invention for those used in the preceding examples.

Example 1

Example 1a 100 g of Ronasphere® ($SiO_2$ beads having a particle size of <20 μm from Merck KGaA) are dispersed in 1900 g of deionized water with stirring and heated to 80° C., and the pH is adjusted to 3.0 using 10% hydrochloric acid. 375 g of iron(III) chloride solution (Fe=15%) are then metered in, and the pH is kept constant at 3.0 by simultaneous addition of 32% sodium hydroxide solution. The hue angle is measured using a MINOLTA CR-300 colorimeter. The suspension is stirred at the same temperature and stirring speed for a further 30 minutes, and the pH is then adjusted to pH 7.5 using 32% sodium hydroxide solution. The silicate layer is then applied—by addition of a mixture of 167 g of sodium water-glass ($SiO_2$ content=27%) and 167 g of deionized water—at a metering rate of 1.56 ml/min at 80° C. and pH 7.5 with stirring. The pH is kept constant using 10% hydrochloric acid during the coating operation, the suspension is stirred for a further 15 minutes at the end of the coating operation, and the pH is subsequently adjusted to 6.0. The suspension is placed on one side until its next use.

Example 1b 72 g of Levasil® 200 in dispersion (30%) ($SiO_2$ beads having a particle size of 10–80 nm from Bayer AG) are diluted with 3528 ml of deionized water with stirring and heated to 90° C., and the pH is adjusted to 2.8 using 10% hydrochloric acid. 855 g of iron(III) chloride solution (Fe=15%) are then metered in, and the pH is kept constant at 2.8 by simultaneous addition of 32% sodium hydroxide solution. The hue angle of the suspension is then 33.7°. The hue angle is measured using a MINOLTA CR-300 colorimeter. The suspension is stirred at the same temperature and stirring speed for a further 30 minutes, and the pH is then adjusted to pH 7.5 using 32% sodium hydroxide solution. The silicate layer is then applied—by addition of a mixture consisting of 76.0 g of sodium water-glass ($SiO_2$ content=27%) and 76 ml of deionized water—at a metering rate of 1.8 ml/min at 90° C. and pH 7.5 with stirring. The pH is kept constant using 10% hydrochloric acid during the coating operation. At the end of the coating operation, the suspension is stirred for a further 15 minutes, and the pH is subsequently adjusted to 6.0.

The entire Ronasphere® suspension is mixed with the entire Levasil® suspension. The mixture is allowed to settle and cool, and the clear supernatant solution is decanted off. The base sediment is stirred up, filtered off via a suction filter, washed with deionized water until salt-free, dried at 110° C. and subsequently calcined at 825° C. for 30 minutes, giving a red powder having an iron(III) oxide content of 59%.

Example 2

Example 2a 90 g of Ronasphere® are dispersed in 1710 g of deionized water with stirring and heated to 75° C., and a pH of 2.2 is set using 10% hydrochloric acid. 1076 g of titanium tetrachloride solution (content=30%) are then metered in. During this addition, the pH is kept constant at 2.2 using 32% sodium hydroxide solution. The metering is interrupted after 60 minutes, the pH is set to 3.2, and the metering is continued. After the addition is complete, the mixture is stirred for a further 30 minutes. For application of the silicate layer, the pH is set to 7.5 over the course of 30 minutes, and the coating operation is then started as follows: a solution—consisting of 167.1 g of sodium water-glass ($SiO_2$ content=27%) and 167.1 g of deionized water—is metered in at 1.15 ml/min at 75° C. with stirring, and at the same time the pH is kept constant at 7.5 by addition of 10% hydrochloric acid. When the addition of the sodium water-glass solution is complete, the mixture is stirred for a further 30 minutes, the pH is subsequently set to pH 6.0 over the course of 30 minutes using hydrochloric acid, and the mixture is stirred for a further 30 minutes.

This suspension is placed on one side until its next use.

Example 2 b 100.6 g of Levasil® dispersion (30%) are dispersed in 5083 ml of deionized water with stirring and heated to 85° C., and a pH of 1.8 is set using 10% hydrochloric acid. 1556.0 g of titanium tetrachloride solution (content=30%) are then metered in. During this addition, the pH is kept constant at 1.8 using 32% sodium hydroxide solution. The metering is interrupted after 60 minutes, the pH is set to 2.2, and the metering is continued, with the metering being carried out at 4.3 ml/min in the first 30 minutes and then at 8.6 ml/min. The metering is terminated after the L value of the suspension has no longer risen within the last 20 minutes. The L value of the suspension is measured using a Minolta CR-300 colorimeter. The mixture is then stirred for a further 30 minutes. For application of the silicate layer, the pH is set to 7.5 over the course of 30 minutes, and the coating operation is then started as follows: a solution—consisting of 167.1 g of sodium water-glass ($SiO_2$ content=27%) and 167 ml of deionized water—is metered in at 2.8 ml/min at 85° C. with stirring, and at the same time the pH is kept constant at 7.5 by addition of 10% hydrochloric acid. When the addition of the sodium water-glass solution is complete, the mixture is stirred for a further 30 minutes, the pH is subsequently set to pH 6.0 over the course of 30 minutes using hydrochloric acid, and the mixture is stirred for a further 30 minutes.

The entire Ronasphere® suspension is admixed with the entire Levasil® suspension, and this suspension is allowed to settle and cool. The clear supernatant solution is decanted off. The base sediment is stirred up, filtered off via a suction filter, washed with deionized water until salt-free, dried at 110° C. and subsequently calcined at 600° C. for 30 minutes, giving a white powder having a titanium dioxide content of 61%.

Example 3

Example 3a 150 g of Ronasphere® are dispersed in 1850 g of deionized water with stirring and heated to 85° C. Throughout the coating operation, post-reaction and pH adjustment, oxygen is passed into the suspension. The pH is adjusted to 3.5 by dropwise addition of 20% sulfuric acid. The iron(II/III) sulfate solution—consisting of 99.8 g of iron(III) sulfate (80%) and 111.1 g of iron(II) sulfate * heptahydrate and 389 g of deionized water—is subsequently metered in. During this addition, the pH is kept constant at 3.5 using 32% sodium hydroxide solution. The metering is continued until the hue angle of the suspension—which initially rises constantly—begins to fall. The hue angle is measured using a MINOLTA CR-300 colorimeter. The suspension is stirred at the same temperature and stirring speed for a further 60 minutes, the pH is adjusted to pH 7.5—over the course of 60 minutes—using 32% sodium hydroxide solution, and the pH regulation is continued for a further 30 minutes. The oxygen introduction is terminated, and the silicate coating operation is begun. To this end, the silicate layer is applied—by addition of a solution consisting of 163.8 g of sodium water-glass ($SiO_2$ content=27%) and 164 ml of deionized water—at a metering rate of 1.9 ml/min at 85° C., pH 7.5 and with stirring. The pH is kept constant at 7.5 using 20% sulfuric acid during the coating operation. At the end of the coating operation, the suspension is stirred for a further 15 minutes, and the pH is subsequently adjusted to 6.0. The suspension is placed on one side until its next use.

Example 3b 66 g of Levasil® dispersion are dispersed in 3234 ml of deionized water with stirring and heated to 80° C. Throughout the coating operation, post-reaction and pH adjustment, oxygen is passed into the suspension. The pH is adjusted to 3.5 by dropwise addition of 20% sulfuric acid. The iron(II/III) sulfate solution—consisting of 282.2 g of iron(III) sulfate (80%) and 314.2 g of iron(II) sulfate * heptahydrate and 1100 ml of deionized water—is subsequently metered in at a metering rate of 0.9 ml/min within the first 10 minutes. During this addition, the pH is kept constant at 3.5 using 32% sodium hydroxide solution. The metering rate is successively increased, i.e. to 1.8 ml/min for a further 10 minutes, then 2.7 ml/min and finally to 3.6 ml/min. The metering is continued until the hue angle of the suspension—which initially rises constantly—begins to fall. The hue angle is measured using a MINOLTA CR-300 colorimeter. The suspension is stirred at the same temperature and stirring speed for a further 60 minutes, the pH is adjusted to pH 7.5—over the course of 60 minutes—using 32% sodium hydroxide solution, and the pH regulation is continued for a further 30 minutes. The oxygen introduction is terminated, and the silicate coating operation is begun. To this end, the silicate layer is applied—by addition of a solution consisting of 163.6 g of sodium water-glass ($SiO_2$ content=27%) and 164 ml of deionized water—at a metering rate of 1.9 ml/min at 80° C., pH 7.5 and with stirring. The pH is kept constant at 7.5 using 20% sulfuric acid during the coating operation. At the end of the coating operation, the suspension is stirred for a further 15 minutes and the pH is subsequently adjusted to 6.0.

The entire Ronasphere® suspension is admixed with the entire weight of Levasil® suspension. This suspension is allowed to settle and cool, and the clear supernatant solution is decanted off. The base sediment is stirred up, filtered off via a suction filter, washed with deionized water until salt-free, dried at 110° C. and passed through a 100 μm sieve, giving a yellow powder having an iron oxide hydroxide content of 51%.

Example 4

Example 4a 100 g of Ronasphere® are dispersed in 1900 g of deionized water with stirring and heated to 75° C., and the pH is adjusted to 2.8 using 10% hydrochloric acid. 1425 g of iron(III) chloride solution (Fe=7.5%) are then metered in, and the pH is kept constant by simultaneous addition of 32% sodium hydroxide solution. The suspension is stirred at the same temperature and stirring speed for a further 30 minutes, and the pH is then adjusted to pH 7.5 using 32% sodium hydroxide solution. The silicate layer is then applied—by addition of a mixture of 93.6 g of sodium water-glass ($SiO_2$ content=27%) and 93.6 g of deionized water—at a metering rate of 1.75 ml/min at 75° C. and pH 7.5 with stirring. The pH is kept constant using 10% hydrochloric acid during the coating operation, the suspension is stirred for a further 15 minutes at the end of the coating operation, and the pH is subsequently adjusted to 6.0. The suspension is placed on one side until its next use.

Example 4b 76.7 g of Levasil® dispersion (30%) are diluted with 3871 g of deionized water with stirring and heated to 75° C., and the pH is adjusted to 2.8 using 10% hydrochloric acid. 2146.6 g of iron(III) chloride solution (Fe=7.5%) are then metered in, and the pH is kept constant at 2.8 by simultaneous addition of 32% sodium hydroxide solution. The suspension is stirred at the same temperature and stirring speed for a further 30 minutes, and the pH is then adjusted to pH 7.5 using 32% sodium hydroxide solution. The silicate layer is then applied—by addition of a mixture of 93.8 g of sodium water-glass ($SiO_2$ content=27%) and 94 g of deionized water—at a metering rate of 3.4 ml/min at 75° C. and pH 7.5 with stirring. The pH is kept constant using 10% hydrochloric acid during the coating operation, the suspension is stirred for a further 15 minutes at the end of the coating operation, and the pH is subsequently adjusted to 6.0.

The entire Ronasphere® suspension is mixed with the entire Levasil® suspension, and, after settling, the clear supernatant solution is decanted off. The base sediment is stirred up, filtered off via a suction filter, washed with deionized water until salt-free and dried at 110° C., giving a rust-red pigment. 100 g of this pigment are introduced into a quartz boat and transferred into a quartz furnace. The reduction is carried out under forming gas (8% of H2/92% of N2) at 500° C. for 30 minutes. After the calcination, the boat containing the pigment is removed from the furnace, giving a black powder having a magnetite (Fe3O4) content of 68%.

Example 5

Example 5a 100 g of Ronasphere® are dispersed in 1900 g of deionized water with stirring and heated to 80° C., and the pH is adjusted to 3.0 using 10% hydrochloric acid. 375 g of iron(III) chloride solution (Fe=15%) are then metered in, and the pH is kept constant at 3.0 by simultaneous addition of 32% sodium hydroxide solution. The hue angle of the suspension is then 39°. The hue angle is measured using a MINOLTA CR-300 colorimeter. The suspension is stirred at the same temperature and stirring speed for a further 30 minutes, and the pH is then adjusted to pH 7.5 using 32% sodium hydroxide solution. The silicate layer is then applied—by addition of a mixture of 167 g of sodium water-glass ($SiO_2$ content=27%) and 167 g of deionized water—at a metering rate of 1.56 ml/min at 80° C. and pH 7.5 with stirring. The pH is kept constant using 10% hydrochloric acid during the coating operation, the suspension is stirred for a further 15 minutes at the end of the coating operation, and the pH is subsequently adjusted to 6.0. The suspension is placed on one side until its next use.

Example 5b 63.0 g of Levasil® dispersion (30%) are dispersed in 1471 g of deionized water with stirring and heated to 85° C., and a pH of 1.8 is set using 10% hydrochloric acid. 1538.9 g of titanium tetrachloride solution (30%) are then metered in within the first 60 minutes at a metering rate of 1.3 ml/min. During this addition, the pH is kept constant at 1.8 using 32% sodium hydroxide solution. The metering is interrupted after 60 minutes, the pH is set to 2.2, and the metering is continued. When the addition is complete, the mixture is stirred for a further 30 minutes. For application of the silicate layer, the pH is set to 7.5 over the course of 30 minutes, and the coating operation is then started as follows: a solution—consisting of 139.2 g of sodium water-glass (SiO$_2$ content=27%) and 139.2 g of deionized water—is metered in at 2.4 ml/min at 85° C. with stirring, and at the same time the pH is kept constant at 7.5 by addition of 10% hydrochloric acid. When the addition of the sodium water-glass solution is complete, the mixture is stirred for a further 30 minutes, the pH is subsequently set to pH 6.0 using hydrochloric acid over the course of 30 minutes, and the mixture is stirred for a further 30 minutes.

The entire Ronasphere® suspension is mixed with the entire Levasil® suspension, and the clear supernatant solution is decanted off. The base sediment is stirred up, filtered off via a suction filter, washed with deionized water until salt-free, dried at 110° C. and subsequently calcined at 825° C. for 30 minutes, giving a pink powder having an iron(III) oxide content of 18% and a titanium dioxide content of 37%.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever. Also, any preceding examples can be repeated with similar success by substituting the generically or specifically described reactants and/or operating conditions of this invention for those used in such examples.

Throughout the specification and claims, all temperatures are set forth uncorrected in degrees Celsius and, all parts and percentages are by weight, unless otherwise indicated.

What is claimed is:

1. A spherical absorption pigment, which comprises:
    a component A comprising spherical particles having a particle size of 1–100 nm which are coated with one or more color-providing layers and, over the color-providing layer(s), a layer of SiO$_2$
    and
    a component B comprising spherical particles having a particle size of 0.5–50 μm which are coated with one or more color-providing layers and, over the color-providing layer(s), a layer of SiO$_2$.

2. A spherical absorption pigment according to claim 1, wherein the spherical particles for at least one of component A and component B are SiO$_2$ beads, TiO$_2$ beads, nanoscale metal particles, polymer beads, glass beads and/or hollow glass beads.

3. A spherical absorption pigments according to claim 1, wherein the spherical particles for both component A and component B are SiO$_2$ beads.

4. A spherical absorption pigment according to claim 1, wherein at least one color-providing layer for at least one of component A and component B is a layer of a metal oxide, metal sulfide, metal nitride, metal oxynitride, metal or mixture thereof.

5. A spherical absorption pigment according to claim 4, wherein at least one color-providing layer is TiO$_2$, ZrO$_2$, SnO$_2$, ZnO, BiOCl, Ce$_2$O$_3$, FeO(OH), Fe$_2$O$_3$, Fe$_3$O$_4$, TiFe$_2$O$_5$, Cr$_2$O$_3$, Fe$_4$[Fe(CN)$_6$]$_3$, a titanium sub-oxide, a titanium oxynitride, pseudobrookite, titanium nitride, CoO, CO$_3$O$_4$, VO$_2$, V$_2$O$_3$, NiO, CoAl$_2$O$_4$, BiVO$_4$, Ce$_2$S$_3$, MoS$_2$, Al, Fe, Cr, As, Au, Pt, Pd or mixture thereof.

6. A spherical absorption pigment according to claim 1, wherein component A and/or component B comprises one, two, three, four, five or seven color-providing layers.

7. A spherical absorption pigment according to claim 4, wherein component A and/or component B comprises one, two, three, four, five or seven color-providing layers.

8. A spherical absorption pigment according to claim 5, wherein component A and/or component B comprises one, two, three, four, five or seven color-providing layers.

9. A spherical absorption pigment according to claim 6, wherein component A and/or component B comprises one, two or three color-providing layers.

10. A spherical absorption pigment according to claim 1, wherein the color-providing layer(s) in component A and component B are each one or more metal-oxide layers.

11. A spherical absorption pigment according to claim 10, wherein the metal oxide layers are TiO$_2$, Fe$_2$O$_3$, Fe$_3$O$_4$, FeO(OH), an iron titanate, pseudobrookite or a mixture thereof.

12. A spherical absorption pigment of claim 1, wherein color-providing layer(s) for component A and component B are the same.

13. A spherical absorption pigment according to claim 1, wherein component A and component B are mixed in a weight ratio of from 1:10 to 10:1.

14. A spherical absorption pigment according to claim 1, wherein at least one of component A and component B additionally has an outer protective layer in order to increase the light, temperature and/or weather stability.

15. A process for the preparation of a spherical absorption pigment according to claim 1, which comprises mixing the spherical particles of components A and B with one another in suspension, and coating the spherical particles by wet-chemical processes by hydrolytic decomposition of metal salts in aqueous and/or organic solvents and/or by means of CVD and/or PVD processes or by reduction from an aqueous solution of metal salts.

16. A paint, coating, printing ink, security printing ink, plastic, ceramic material, glass, tracer, or cosmetic composition comprising a spherical absorption pigment of claim 1.

17. A cosmetic composition comprising a spherical absorption pigment of claim 1.

18. A dry pigment composition comprising a spherical absorption pigment of claim 1.

* * * * *